Patented Mar. 1, 1938

2,109,929

UNITED STATES PATENT OFFICE 2,109,929

PREPARATION OF AMINO ACIDS

George W. Rigby, Wilmington, Del., assignor to E. I. du Pont de Nemours & Company, Wilmington, Del., a corporation of Delaware No Drawing. Application March 15, 1937, Serial No. 131,111

18 Claims. (Cl. 260—112)

This invention relates to the preparation of amino acids, more particularly to the preparation of amino acids by the reaction of certain halogen-containing carboxylic acids with liquid ammonia.

This invention has as an object an improved process for the preparation of amino acids of the type wherein the amino group is attached to a carbon atom which is in turn attached to two carbon atoms, one of which is preferably the carbon atom of a carboxyl group. Therefore, a further object is an improved process for the preparation of $\alpha$-amino acids having at least three carbon atoms. A still further object is an improvement in the yield of amino acid. A still further object is the preparation of the amino acid in a more readily purified and isolated form. Therefore, an object of the invention is the simplification of the process of preparing amino acids. Other objects will appear hereinafter.

These objects are accomplished by the following invention, wherein liquid ammonia is reacted, under conditions outlined more fully below, with halogen-containing carboxylic acids in which the halogen atoms and carboxyl groups are separated by saturated hydrocarbon radicals, and in which the carbons to which the halogens are attached are in turn joined to at least two carbon atoms. The acid should preferably be an $\alpha$-halogenated acid having only one halogen and one carboxyl group.

In the preferred embodiment of this invention, a solution of an aliphatic $\alpha$-halogen monocarboxylic acid in from 15 to 20 molecular equivalents of liquid ammonia is heated to 50–80° C. for 24 hours in a sealed vessel capable of withstanding the pressure which develops. The liquid ammonia is then removed by evaporation and the solid heated on a steam bath to decompose the ammonium salt of the acid. The free amino acid and the ammonium halide formed in the reaction are separated by fractional crystallization. Water, aqueous alcohol, aqueous acetic acid or glacial acetic acid are suitable solvents for this separation. In general the molal ratio of ammonia to acid should preferably be in the range of from $15x:1$ to $20x:1$, where $x$ is the number of halogen atoms in the acid.

Having thus outlined the purposes and preferred procedure of the invention, the following exemplifications thereof, wherein the parts are by weight unless otherwise stated, are added in illustration and not in limitation:

Example I $\alpha$-Bromo-n-caproic acid was prepared by causing 200 parts of n-caproic acid to react with 300 parts of bromine (which had been dried with concentrated sulfuric acid) and 3 parts by volume of phosphorous trichloride. The mixture was heated to 65 to 70° C. under a reflux condenser for 6 hours, then at 100° C. for 2 hours. The solution was subjected to a slight vacuum for 1 hour to remove unreacted bromine, hydrogen bromide, and the catalyst. The product was then vacuum distilled. A total of 256.3 parts or 76% of the theoretical amount of $\alpha$-bromo-n-caproic acid (B. P. 105° C./20mm.) was obtained.

To 145 parts of liquid ammonia contained in a suitable pressure vessel was added 100 parts of the above $\alpha$-bromo-n-caproic acid. The homogeneous solution was heated at 50° C. for 24 hours. At the end of this time the excess ammonia was removed and the remaining white solid was pulverized and heated on a steam bath at 50–105° C. until ammonia was no longer evolved. (This decomposes the ammonium salt of the amino acid and simplifies purification.) The dry product amounted to 121 parts. The solid was then refluxed with 300 parts of absolute alcohol, filtered, washed with 100 parts of hot absolute alcohol and dried. The yield was 64 parts or 95.4% of the theoretical amount of $\alpha$-amino-n-caproic acid.

The amino acid is best recrystallized from 25% aqueous acetic acid from which it separates as glistening plates which are free from ammonium ions as shown by the absence of any orange precipitate when a small sample dissolved in water is treated with potassium mercuric iodide solution. Upon analysis, the product was found to have a nitrogen content of 11.03% whereas the calculated amount for $\alpha$-amino-n-caproic acid is 10.69%.

Example II

One hundred parts of stearic acid, 95 parts of dry bromine and one part by volume of phosphorous trichloride were heated under a reflux condenser at 65 to 70° C. for 6 hours, then at 100° C. for 1 hour. After removing the excess bromine and the catalyst under a slight vacuum, the α-bromostearic acid was recrystallized from petroleum ether and dried in a vacuum desiccator. The yield was 99 parts or 77% of the theoretical amount. The α-bromostearic acid had a melting point of 58° C. and a neutralization equivalent of 362 (theoretical 363).

Thirty-four (34) parts of the α-bromostearic acid prepared above was dissolved in 132 parts of anhydrous liquid ammonia in a suitable pressure vessel and the mixture heated at 50° C. for 24 hours. After removal of the excess ammonia the white solid was pulverized and heated on the steam table at about 90° C. until no more ammonia was evolved. The solid at this stage amounted to 34.4 parts. After washing with distilled water until the aqueous filtrate was halogen-free (as shown by adding silver nitrate to a small test portion), the solid was dried at 50° C. The yield was 28 parts of α-amino-stearic acid, the theoretical amount. Recrystallization from glacial acetic acid yielded shining plates of M. P. 230 to 240° C. (with decomposition).

Example III

α-Bromomyristic acid was prepared in 72% yield by the method used in Example I for preparing α-bromocaproic acid. After purification by vacuum distillation, it had a melting point of 42–43° C. and a neutralization equivalent of 290.

One hundred parts of α-bromomyristic acid as prepared above was mixed with 145 parts of anhydrous liquid ammonia contained in a suitable pressure vessel. The temperature was raised to 50° C. and maintained there for 24 hours. The excess ammonia was then removed and the solid crushed and heated on a steam table (90–100° C.) until ammonia was no longer evolved. The solid thus obtained weighed 112.1 parts. The α-aminomyristic acid was washed repeatedly with distilled water until the washings were halogen-free. After washing twice with 100 parts of absolute alcohol, the α-amino acid was dried. The yield amounted to 70.6 parts or 89% of the theoretical. The amino acid can be recrystallized from glacial acetic acid.

Example IV

Lauric acid (M. P. 43.8° C. and neutralization equivalent 200.2) was brominated according to the method given in Example I for making α-bromocaproic acid. α-Bromolauric acid, B. P. 166° C./0.44 mm. and neutralization equivalent 260 was obtained in 85% yield.

Thirty (30) parts of α-bromolauric acid as prepared above was dissolved in 112 parts of liquid ammonia in a suitable pressure vessel and heated at 50° C. for 24 hours. After removal of the excess ammonia the white solid was crushed and dried at room temperature. The solid amounted to 33.6 parts. This material was washed with 1% acetic acid until the washings were halogen-free. After drying at 50° C., the solid α-aminolauric acid amounted to 23 parts or 99.5% of the theoretical amount.

In a similar experiment 10 parts of alpha-bromolauric acid, 10 parts of ethyl ether and 100 parts of anhydrous liquid ammonia were allowed to stand at room temperature in a pressure bottle for 48 hours. α-Aminolauric acid was obtained.

Example V

One hundred (100) parts of α-chloroisobutyric acid (prepared by chlorination of isobutyric acid as described in U. S. 2,043,670) was dissolved in 145 parts of anhydrous liquid ammonia in a suitable pressure vessel. The temperature was then raised to 50° C. where it was maintained for 24 hours. After the removal of the excess ammonia by heating on a steam bath (90-100° C.), the solid amounted to 137.5 parts. The amino acid was extracted from this solid by means of glacial acetic acid. An equal volume of ether was added to the acetic acid solution and the precipitate filtered off, washed with ether and dried. The yield was 76 parts or 90% of the theoretical amount. The α-aminoisobutyric acid may be recrystallized, if desired, by dissolving in a small volume of water and precipitating with a large volume of alcohol. It was soluble in water and glacial acetic acid, slightly soluble in alcohol, insoluble in ether, and sublimed without melting at about 280° C.

Example VI

α-Bromocaprylic acid (B. P. 140° C./5 mm. and neutralization equivalent 208.4) was prepared in 88.5% yield by brominating caprylic acid (M. P. 15.2° C. and neutralization equivalent 143) according to the method given in Example I for making α-bromocaproic acid. One hundred (100) parts of this α-bromocaprylic acid was mixed with 145 parts of anhydrous liquid ammonia in a suitable pressure vessel. The temperature was then raised to 50° C., where it was maintained for 24 hours. After removing the excess ammonia by heating the pulverized solid on a steam table (about 95° C.), the residue amounted to 107.3 parts. This material was boiled with 300 parts of absolute alcohol, filtered and washed with absolute alcohol until the washings were halogen-free. After drying at room temperature, the solid α-aminocaprylic acid amounted to 67.9 parts or 95% of the theoretical amount. α-Aminocaprylic acid may be recrystallized from aqueous acetic acid or from hot water. It melts with decomposition and sublimation at 263–265° C., is slightly soluble in alcohol and ether, and is moderately soluble in water, from which it separates in glittering plates.

Example VII

α-Bromocapric acid (B. P. 145° C./3 mm. and neutralization equivalent 232) was prepared in 74% yield by brominating capric acid (M. P. 31° C. and neutralization equivalent 172) according to the method given in Example I for making α-bromocaproic acid. One hundred (100) parts of this bromo acid was mixed with 145 parts of anhydrous liquid ammonia in a suitable pressure vessel. The solution was heated to 50° C. and maintained at this temperature for 24 hours. At the end of this time the vessel was cooled and opened, and the excess ammonia driven off. The white solid thus obtained amounted to 84.3 parts. This material was refluxed with 300 parts of absolute alcohol, filtered, washed with absolute alcohol until the washings were halogen-free, and dried. The yield was 69 parts or 93% of the theoretical quantity of α-aminocapric acid. The amino acid may be conveniently crystallized from aqueous acetic acid.

Example VIII

α,α'-Dibromosebacic acid was prepared by the bromination of sebacic acid under essentially the conditions disclosed in Example I.

Fifty parts of α,α'-dibromosebacic acid was dissolved in 145 parts of anhydrous liquid ammonia in a suitable pressure vessel. The temperature was raised to 50° C. and maintained for 24 hours.

The crude α,α'-diaminosebacic acid, as obtained after removing the excess ammonia and heating on the steam bath to decompose the ammonium salt, was washed with water until the washings were halogen-free. After drying at room temperature, the product was washed with ether and dried. The α-amino acid is insoluble in water, alcohol, and glacial acetic acid. Purification was effected by dissolving the acid in 50 times its weight of hot aqueous ammonia, filtering and heating on the steam bath (80–100° C.) until the free acid no longer separated. The yield of purified diamino acid amounted to 29 parts, or 83% of the theoretical. Upon analysis the product was found to contain 50.22% carbon and 8.56% hydrogen as compared to calculated values of 51.71% and 8.62%, respectively.

As starting materials, I may use any of the simple aliphatic halogen acids having halogen on two carbons attached to two carbons, for example, α-chloropropionic, α-bromo-n-butyric, α-iodo-n-butyric, α-chloroisobutyric, β-chloro-n-butyric, α-bromo-α-methylpentanoic, α-bromocaproic, α-bromoheptylic, α-bromocapric, α-bromocaprylic, α-bromolauric, α-chlorostearic, α-bromomyristic, α-bromostearic, α-chloro- α-phenylacetic, α-bromosuccinic, α,α'-dibromosebacic, α,α'-dichloroadipic, β-chloro-β-phenylpropionic, and 10-bromoundecanoic acids. (In identifying the position of the halogen by number, the carboxyl carbon is counted.) By "simple aliphatic halogen acids" is meant those in which halogen is attached to aliphatic carbons (i. e. carbon which is not a part of an aromatic nucleus), and those which are free of all reaction centers except halogen and carboxyl. Reaction centers such as ethylenic and acetylenic unsaturation hydroxyl groups, mercapto groups, ketone groups, aldehyde groups, nitro groups and the like should be avoided. Polyhalogen acids having a tendency to undergo ring formation may also cause complications in reaction and product.

The monobasic acids may conveniently be termed acids of the formula

wherein R is a saturated aliphatic hydrocarbon radical and R' is a saturated hydrocarbon radical, e. g. phenyl, ethyl, methyl as in the above examples. R' is preferably aliphatic.

While acids containing halogen on carbon attached to two carbons are of generic utility in the process of the present invention, monohalogen, monocarboxylic acids are preferred because of greater freedom from side reactions, higher yields (compare Example VIII with the remaining examples), more ready purification of the product by simple means such as crystallization, and availability and economy of the raw materials, the acid being readily prepared in good yield by, for example, the process of U. S. 2,043,670.

The halogen acids most suitable for use in this invention may also be chosen on the basis of the relative position of halogen and carboxyl groups. The halogen acids that are preferred to all other types are those in which (a) the halogen atoms and carboxyl groups are separated by saturated hydrocarbon radicals (b) the carbons to which the halogens are attached are joined to two other carbons (c) one of the latter carbons is a carboxyl carbon. These acids are the α-halogen acids of at least three carbon atoms, which acids have no reaction centers except halogen atoms and carboxyl groups. They give better results in the present process because of a greater reactivity with liquid ammonia than other types of halogen acids, and because of the resulting α-amino acids are characteristically easier to isolate from solution in liquid ammonia than other types of amino acids. As a result of their practical neutrality, due probably to inner salt formation, it is only necessary, after the excess ammonia is driven off, to warm the powdered reaction product on a steam bath in order to decompose the ammonium salt and liberate the free acid. Moreover, this same property of the α-amino acids makes it possible to crystallize them from aqueous (see Example I) or even glacial (see Example II) acetic acid solution. Also from Example VIII it can be seen that the α-amino acid may often be purified merely by solution in warm aqueous ammonia and heating on the steam bath to remove ammonia and concentrate the solution. These facilities in isolation and purification are not realized when other types of acids than α-halogen acids are used in the process.

An ammonia: acid mol. ratio in the range of from $15x$ to $20x:1$ (where $x$ is the number of halogen atoms in the acid) has been found to give excellent results. Greater or lesser amounts may be used if desired. The lower practical ratio is as a rule around $8x$ to $10x:1$. So far as is known, there is no upper limit to the amount of ammonia which can be used but there is no advantage to employing a ratio above about $20x:1$ unless the halogen acid and amino acid tend to react to form a secondary amine.

The liquid ammonia (substantially anhydrous liquid ammonia, e. g. the commercially available material which may contain traces of water) may be used alone or in mixture with an inert organic diluent such as diethyl ether, dibutyl ether, dioxane dibenzyl ether, diphenyl ether, anisole, benzene, toluene, xylene ethylbenzene, cymene, cyclohexane, cyclopentane, low boiling petroleum hydrocarbons, tetrahydronaphthalene, and other ethers and hydrocarbons. The inert diluent, where used, is preferably but not necessarily a solvent for the halogen and amino acids, and in all cases it should be chemically inert toward the reactants and reaction product under the conditions of reaction. The diluent should preferably be one from which the reaction product is separated by conventional means.

The use of temperatures of from 50 to 80° C. in reacting liquid ammonia with halogen acid has given good results although higher or lower temperatures, for example, 0 to 200° C. in many cases may be employed. In the case of β-halogen acids in particular, however, the temperature should be kept below that point (about 120° C.) at which the halogen acid, as well as the desired amino acid have any appreciable tendency to decompose to the unsaturated acid (the halogen acid by dehydrohalogenation and the amino acid by deammoniation). In the case of α-halogen acids, the temperature should be below that at which the corresponding amino acid tends to be converted to a secondary amine; this does not often occur below 200° C., however, unless the mol. ratio of ammonia is very low.

In decomposing the ammonium salt of the amino acid, the temperature should as a rule be that at which substantially complete dissociation of the ammonium salt takes place at a practical rate and without decomposition of amino acid.

The time of the reaction has been varied from 4 to 72 hours, depending upon the halogen acid used and upon the temperature employed. In general a long reaction time seems preferable to one which is too short since no ill effects seem to result from long heating while incomplete reaction leaves unreacted halogen acid which is troublesome to remove.

This invention is useful as a method for preparing amino acids from halogen acids. The amino acids in turn are useful as intermediates for the preparation of surface active agents, etc.

This invention is advantageous over the methods of the prior art such as those of Adams and Marvel, J. Am. Chem. Soc. 43, 320 (1920), and Neuberg and Neimann, Z. Physiol. Chem. 45, 92 (1905), since the yields are better, the isolation of the free acid simple, and the product more easily purified. Thus Adams and Marvel obtain only 62 to 67% yields of α-aminocaproic acid while by the present process the yields are practically quantitative (see Example I). Further, the amino acid and ammonium halide are obtained at once as a dry powder from which the amino acid is easily separated by crystallization. In the process of Adams and Marvel, it is necessary to evaporate at least 10 parts of water for each part of amino acid obtained. This evaporation step is expensive and troublesome. In the case of long chain acids, e. g., α-aminolauric acid, the evaporation step is particularly troublesome because the surface activity of the ammonium salt of the amino acid makes the solution foam badly when warmed or when subjected to a vacuum. These difficulties are not encountered with the present process since the excess of low boiling liquid ammonia is easily removed by releasing the pressure at the end of the reaction. Moreover, heating the dry powder thus obtained decomposes the ammonium salts of the α-amino acids and greatly simplifies separation of the ammonium halide from the amino acid.

The process of the present invention offers distinct advantages over that of Flaschentraeger and Halle, Z. Physiol. Chem. 159, 286-296 (1926), who react primary halogen acids, i. e., those in which the carbon holding the halogen is attached to two hydrogens, with a molal deficiency of liquid ammonia. By employing a large excess of the latter reagent, I avoid the large amounts of by-products mentioned by these authors and obtain much higher yields of amino acid. It is also to be noted that the present invention is not concerned with primary halogen acids but only with secondary and tertiary halogen acids, i. e. those in which the carbon holding the halogen is attached to at least two other carbons. I have found that, regardless of the amount of liquid ammonia used, such acids behave quite differently in that they are considerably more reactive giving much higher yields of amino acid and offering less opportunity for by-product formation.

Finally, the present invention, in the practice of which I use only a halogen acid in which the halogen and carboxyl groups are separated by a saturated hydrocarbon radical, offers distinct advantages in yield and freedom from complicating side reactions over known processes [Aberhalden and Heumann, Fermentforschung 12, 42-54 (1930), and Fischer and Scheibler, Ann. 363, 159 (1908)] in which halogen acids having the halogen and carboxyl separated by amide groups are converted with liquid ammonia to the corresponding amino compounds (peptides). The latter authors for example obtain a yield of only 40% whereas I obtain in my process yields of at least 80% and usually at least 95%.

The above description and examples are intended to be illustrative only. Any modification of or variation therefrom which conforms to the spirit of the invention is intended to be included in the scope of the claims.

I claim:

1. Process of preparing aminocarboxylic acids which comprises reacting an excess of liquid ammonia with halogen-containing carboxylic acids characterized in that (a) the halogen atoms and carboxyl groups are separated by saturated aliphatic hydrocarbon radicals, and (b) the carbons to which the halogens are attached are joined to at least two carbon atoms.

2. Process of preparing aminocarboxylic acids which comprises reacting an excess of liquid ammonia, at a temperature of from 0° C. to 200° C., with a halogen-containing carboxylic acid of the type set forth in claim 1.

3. Process of preparing aminocarboxylic acids which comprises reacting liquid ammonia, at a temperature of from 50° C. to 80° C., with a halogen-containing carboxylic acid of the type set forth in claim 1, the molal ratio of ammonia to acid being in the range of from $15x:1$ to $20x:1$, where $x$ is the number of halogen atoms in the acid.

4. Process of preparing α-aminocarboxylic acids which comprises reacting an excess of liquid ammonia with an α-halogen carboxylic acid of the type set forth in claim 1.

5. Process of preparing α-aminocarboxylic acids which comprises reacting an excess of liquid ammonia, at a temperature of from 0° C. to 200° C., with an α-halogen carboxylic acid of the type set forth in claim 1.

6. Process of preparing α-aminocarboxylic acids which comprises reacting an excess of liquid ammonia, at a temperature of from 0° C. to 200° C., with an α-halogen carboxylic acid of the type set forth in claim 1, and thereafter heating the resulting product to decompose the ammonium salt of the amino acid.

7. Process of preparing α-aminocarboxylic acids which comprises reacting an excess of liquid ammonia, at a temperature of from 50° C. to 80° C., with an α-halogen carboxylic acid of the type set forth in claim 1, the molal ratio of ammonia to acid being in the range of from $15x:1$ to $20x:1$, where $x$ is the number of halogen atoms in the acid.

8. Process for the preparation of aminocarboxylic acids which comprises reacting an excess of liquid ammonia with a monohalogen monocarboxylic acid characterized in that (a) the halogen atom and carboxyl group are separated by a saturated aliphatic hydrocarbon radical and (b) the carbon to which the halogen is attached is joined to at least two carbon atoms.

9. Process according to claim 8 in which the acid is an α-halogen acid.

10. Process according to claim 8 in which the acid is an α-halogen acid and the reaction temperature is in the range of from 0° C. to 200° C.

11. Process according to claim 8 in which the acid is an α-halogen acid, the reaction temperature is in the range of from 0° C. to 200° C., and the product of reaction is subsequently heated to decompose the ammonium salt of the amino acid.

12. Process according to claim 8 in which the acid is an α-halogen acid, the reaction temperature is in the range of from 50° C. to 80° C., and the molal ratio of ammonia to acid is in the range of from 15 : 1 to 20 : 1.

13. Process according to claim 8 in which the reaction temperature is in the range of from 50° C. to 80° C., the molal ratio of ammonia to acid is in the range of from 15 : 1 to 20 : 1 and the acid is selected from the class consisting of α-bromolauric acid and α-bromocaproic acid.

14. Process of preparing aminocarboxylic acids which comprises bringing an excess of liquid ammonia in contact with an alpha halogenated saturated aliphatic monocarboxylic acid of at least three carbon atoms.

15. Process of preparing aminocarboxylic acids which comprises reacting an excess of liquid ammonia with an acid of the formula $$\underset{\text{Hal}}{\text{R}'\text{—R—COOH}}$$

wherein R and R' are saturated aliphatic hydrocarbon radicals.

16. Process of preparing aminocarboxylic acids which comprises reacting an excess of liquid ammonia with an acid of the formula $$\underset{\text{Hal}}{\text{R}'\text{—R—COOH}}$$

wherein R is a saturated aliphatic hydrocarbon radical and R' is a saturated hydrocarbon radical.

17. Process of preparing aminocarboxylic acids which comprises reacting an excess of liquid ammonia with an acid of the formula $$\underset{\text{Hal}}{\text{R}'\text{—CH—COOH}}$$

wherein R' is a saturated aliphatic hydrocarbon radical.

18. Process of preparing aminocarboxylic acids which comprises reacting an excess of liquid ammonia with an acid of the formula $$\underset{\text{Hal}}{\text{R}'\text{—CH—COOH}}$$

wherein R' is a saturated hydrocarbon radical.

GEORGE W. RIGBY.